United States Patent [19]

George

[11] 4,134,485
[45] Jan. 16, 1979

[54] BRICK BLENDING METHOD AND APPARATUS

[76] Inventor: Lonnie L. George, 3000 Shamrock Dr., Greensboro, N.C. 27408

[21] Appl. No.: 751,733

[22] Filed: Dec. 17, 1976

[51] Int. Cl.² .......................................... B65G 47/30
[52] U.S. Cl. .............................. 198/456; 198/434; 214/6 A
[58] Field of Search ................ 214/6 R, 6 A, 8.5 C, 214/8.5 F, 152; 198/418, 419, 420, 434, 456; 53/154

[56] References Cited

U.S. PATENT DOCUMENTS

| | | | |
|---|---|---|---|
| 2,630,951 | 3/1953 | Slightam | 53/154 X |
| 3,601,266 | 8/1971 | Pearne et al. | 214/6 A X |
| 3,603,466 | 9/1971 | Lingl | 214/8.5 C X |
| 3,669,283 | 6/1972 | Brown | 214/8.5 C |
| 3,837,466 | 9/1974 | Jones | 198/419 X |
| 3,951,283 | 4/1976 | Lingl | 214/6 A X |

FOREIGN PATENT DOCUMENTS 2031996 12/1971 Fed. Rep. of Germany .......... 214/6 A
2200856 7/1973 Fed. Rep. of Germany ........... 198/434

*Primary Examiner*—Evon C. Blunk
*Assistant Examiner*—James L. Rowland
*Attorney, Agent, or Firm*—Charles R. Rhodes

[57] ABSTRACT

During the manufacture of bricks, either before or after such bricks are introduced to the kiln for drying, selected brick from spaced positions in at least some of the rows are mechanically displaced to corresponding positions in upstream, downstream, or otherwise adjacent rows to effect an inter-row movement of some, but fewer than all of the bricks in any particular row. According to the invention, the selected bricks may be either pushed, lifted, lowered or combinations thereof from one row and transferred to a different row. One translating device designed for this technique is a snaggle-tooth pusher which engages and pushes some, but not all of the bricks in a row or rows. The selected bricks may be initially separated from the other bricks by means of either the snaggle-tooth puller, or by means of a vertically movable support plate which operates in conjunction with a slotted support plate immediately thereabove to remove and lower selected brick.

12 Claims, 28 Drawing Figures

BRICK BLENDING METHOD AND APPARATUS

BACKGROUND OF THE INVENTION

There has been a long felt need for the blending of brick during the manufacture thereof, so that the entire blending job does not become the responsibility of the brick mason as the structure is built. If proper blending is not effected, either by the manufacturer, or by the brick mason, the resulting structure may have an undesirable finished appearance, due to the relative difference in shades of brick, some of which differences are intentional, and some of which cannot be controlled.

For example, during the initial forming of the brick it is common to introduce differently colored sands or slurries for short periods of time, so that each final brick package will include a mixture of differently colored bricks therein. It is not possible to so change the sand colors fast enough, that successive individual bricks will be a different color. It is more likely that a several foot section of extruded clay which eventually may form one or two rows may be of one color, with the preceding or successive section being of a different color. Therefore, after extruding and cutting successive rows, either by a rotating wire or by a push-through cutter, it would be desirable to be able to displace selected bricks from spaced positions in one row to subsequent or preceding rows, so that intra-row blending (i.e., the shades of brick within each row) may be effected.

In known approaches to the solution, there is no attempt to effect intra-row blending by mechanical displacement of selected bricks from spaced positions within one row to either an upstream, downstream, or adjacent row at any time, either during automatic mechanical hacking or dehacking. The only known attempts are directed to the displacement of an entire course, layer, or continuous row portion onto a different course, layer or row from which it was initially processed. See, for example, U.S. Pat. No. 3,717,264 to Lingl, Jr. Such an attempt does not solve the problem of obtaining good blending of the color differences incorporated into a brick run by means of the introduction of different colored sands or slurries for brief periods in the hopper immediately prior to or after extrusion of the brick slugs.

SUMMARY OF THE PRESENT INVENTION

The present invention, therefore, is directed to a method and apparatus for achieving a good intra-row blend of bricks, which will overcome traditional blending problems, as well as those caused by the frequent and periodic change of sand color application to the extruded clay.

There are various embodiments of an apparatus which may be useful to accomplish the goals of the present invention, each of which, in general, includes taking a plurality of selected bricks from spaced positions within one row and displacing the selected bricks into corresponding positions of another adjacent (not necessarily immediately adjacent though) row. The term "adjacent" as used herein means either a preceding or succeeding row of bricks in the brick flow path, or, in some embodiments, might refer to a laterally adjacent row where the selected bricks were moved in a direction transverse to the brick flow path. The row from which the selected bricks were removed is then ready to subsequently, in the next or a successive step, receive replacement bricks for those removed. The selected bricks may be displaced one, two or more rows downstream or upstream, which is easily accomplished and immaterial as to the scope of the invention. Such a technique will afford a total blend throughout the entire brick run, so that the brick mason will be able to construct the ensuing structure without time consuming and sometimes erroneous considerations of the resulting blend he is achieving.

In one apparatus, the selected bricks are pushed forwardly along a blending tray or plate into corresponding openings in preceding rows, previously formed in the same manner. As the rows proceed or are marshalled, the rows from which the selected bricks are removed become the rows into which selected bricks from a successive row are introduced. This process continues throughout the entire brick run. In order to insure good progress of all bricks in a straight line path, a plurality of fingers or stops are selectively movable between a lowered or retracted position and an upstanding position which would be in the path of the bricks not selected to be moved. Therefore, when the selected bricks are moved from the unselected bricks, there is not likely to be any skewing or misalignment of the brick columns.

In another embodiment, a first row of incoming bricks is placed on a receiving portion of the blending plate. Selected brick from spaced positions within the row are then lowered to a lower elevation. A second or preceding row on the same level with the unselected bricks remaining on the upper level is spaced downstream therefrom and has spaces therein corresponding to the bricks remaining in the first row on the upper level. The first-mentioned row on the upper level is then pushed into the second row and removed to the setter table. Subsequently the bricks originally removed from the first row are lifted back up to the upper level to take the place of the second row mentioned hereinabove.

In the method or either of the two aforementioned apparatuses the shifted brick may be displaced one row, two rows, or more, depending on the ultimate desired pattern; however, the important thing is to keep in mind that the method and apparatus according to the present invention envisions the displacement of a plurality of bricks from spaced positions within one row to corresponding positions within other rows either upstream or downstream from the original position. Further, the apparatus may be installed as a module in the hacking or dehacking operation without disrupting or impeding the normal processing operation.

It is therefore an object of the present invention to provide a method and apparatus for effecting intra-row blending of bricks during the processing thereof.

It is another object of the present invention to provide a method and apparatus for blending bricks by moving selected bricks from spaced positions in one row to corresponding positions in other rows.

It is yet another object of the present invention to provide an apparatus for effecting intra-row blending of bricks by simultaneously engaging one set of bricks in each row with stop members and engaging another set of bricks in the row with push members, whereby the other set of bricks in each row are pushed from their original resting place either upstream or downstream of the bricks being processed to second positions within other rows.

Still another object of the present invention is to provide an apparatus for effecting intra-row blending in the manner described, in which selected bricks from spaced positions in each row are moved vertically with respect to the remaining bricks and re-inserted into different rows later in the operation.

Other objects and a fuller understanding of the invention will become apparent from reading the following detailed description of a preferred embodiment of the present invention along with the accompanying drawings in which:

FIGS. 8a and 8b through FIGS. 13a and 13b are sequential elevation and plan views of the steps of operation of the apparatus illustrated in FIG. 1;

DETAILED DESCRIPTION OF THE PREFERRED EMBODIMENT

Figure 1:
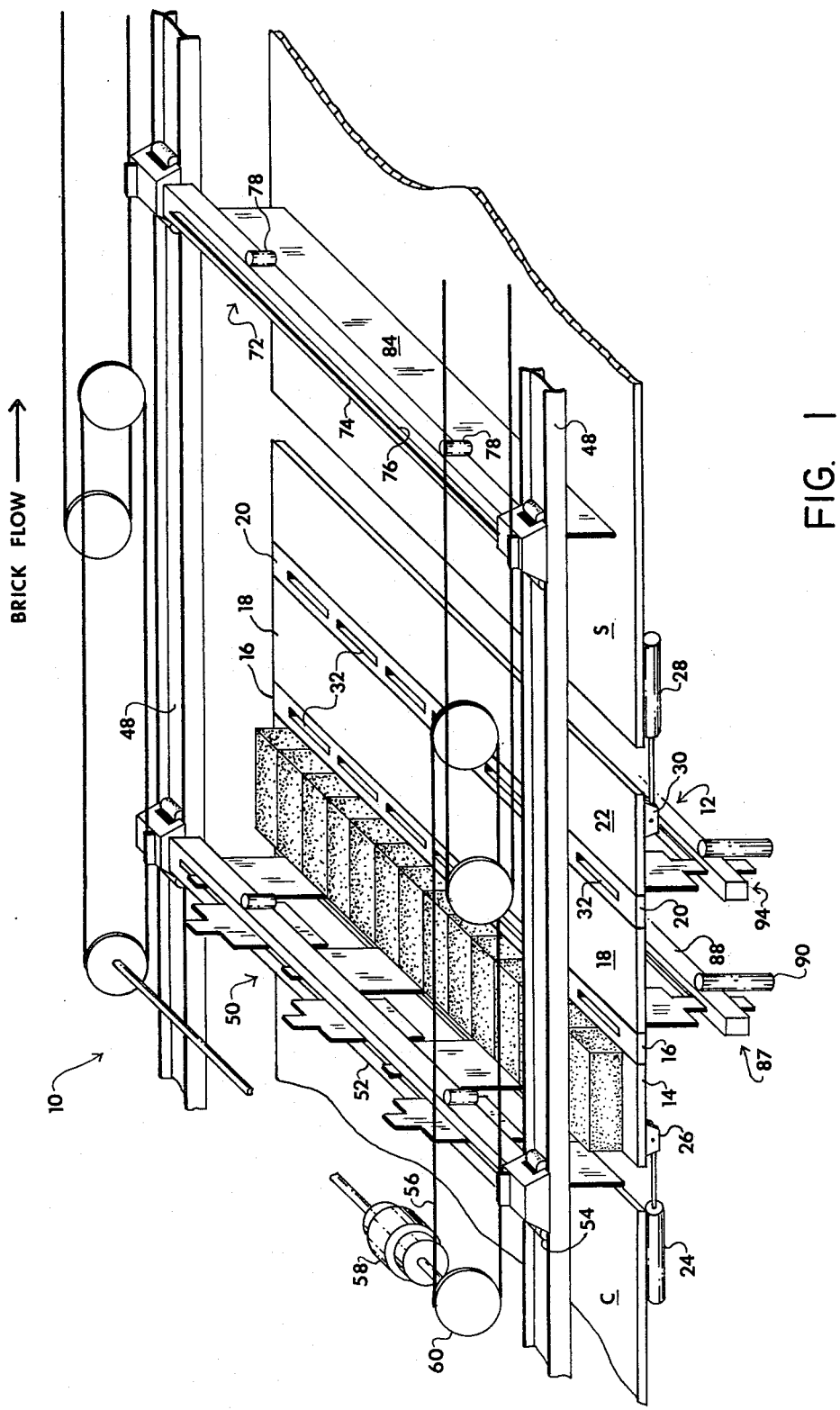
FIG. 1 is a perspective view illustrating the apparatus according to a first embodiment of the invention.

Turning now to the drawings, one preferred form or embodiment of the invention is depicted in FIGS. 1–13, and includes an apparatus 10 for effecting intra-row blending of bricks by inter-row displacement of some selected bricks in each row to another row. The apparatus 10 includes a blending table means 12 for receiving successive rows of unblended brick from an upstream brick forming device which could be a push-through cutter means C, or could be by means of a rotating wire which cuts the bricks from a continuous slug of clay extruded from the brick forming machine. Both of the brick forming apparatuses are conventional, commercially available, do not form a part of the present invention, and therefore are not shown in detail. Each of the apparatuses will include a pushing or push-off mechanism which will initially deposit successive rows of bricks onto the front end of the blending table means 12. For purposes of illustration, only single layer rows have been shown, however, it should be recognized that each row might be multi-layered; further bricks from multiple rows might be shifted simultaneously. Also faced or un-faced bricks could be blended simultaneously. A brick transfer means, illustrated in FIG. 1 a snaggle-tooth puller mechanism 50 moves selected bricks from at least some spaced positions in one row to corresponding positions in an upstream (not illustrated) or downstream (illustrated) row having corresponding openings therein for receiving said brick. Further, the apparatus of FIGS. 1–13 includes means for progressing newly formed and blended rows toward a setter table S as the operation is repeated.

Turning now more to the specifics of the apparatus shown in FIGS. 1–13, the blending table 12 includes a plurality of separate plates 14, 16, 18, 20 and 22, each of which extend transversely across the longitudinal path of the brick rows through the apparatus. The first splitter plate 14 initially receives the bricks from the brick forming apparatus as set forth hereinabove. One or more pneumatic cylinders 24 or other similar longitudinal, horizontal shifting device is mounted to the stationary apparatus framework at a position beneath the first splitter plate 14 and has the operating rod(s) thereof connected to a depending lug(s) 26 extending downwardly from the undersurface of splitter plate 14. Thus the splitter plate is adapted to be shifted from a first or receiving position adjacent the push-through cutter means C to a second, unloading position adjacent the first transition plate 16. The necessity for reciprocating the splitter plate is to space the initial row of bricks received on the splitter plate from the bricks arriving therebehind to provide access for the transfer means (snaggle-tooth puller mechanism 50).

The first transitional plate 16 is provided between the first splitter plate 14 and a blend plate 18 for providing a transitional area in which various upstanding stop means may be selectively activated to allow or prevent passage of bricks therealong. Upon movement of the transfer means, as will be discussed hereinafter, at least some of the bricks from the first row(s) will be pushed across transition plate 16 onto the blend plate 18. In order to provide more flexibility to the system, the transition plate 16 is formed separately from the blend plate 18; however, it is to be recognized that the two could be incorporated into one plate.

The blend plate 18 is merely a flat plate which extends across the width of the brick passageway, and is adapted to receive one, two or more rows of bricks thereon. On the subject of brick, the instant invention is adapted for use with either standard, modular, oversize or utility type brick. A second transition plate 20 also includes a stop means which is selectively activated therethrough, and which will be described more in particular hereinafter. Finally, a second splitter plate 22 includes one or more depending lugs 30 operatively connected to one or more pneumatic cylinders 28 for moving the second splitter plate between a receiving position in which it is snugly up against the second transition plate 20, and an unloading position in which it is moved horizontally downstream to a position against setter table S. Each of the transition plates 16,20, includes one or more transversely extending slots through which the stop means to be hereinafter described moves.

Turning now to a discussion of the puller bar mechanism assembly 50, a pair of support rails 48 are mounted in any suitable manner to extend above and in spaced relation along the longitudinal direction of the brick passageway between the push through cutter means C and setter table S with the distance therebetween being slightly greater than the length of the brick rows being processed therethrough. Assembly 50 includes a housing 52 extending transversely between the rails 48, and a set of wheels or casters 54 on either end thereof for supporting the housing on the rails in movable relationship thereto. The housing is moved back and forth along the rails by a chain drive assembly which includes a chain 56 with either end thereof connected to opposite sides of the housing and extending across sprockets 60 at either end of the path thereof. A motor 58 drives one of the sprockets, so that upon movement of the motor shaft in either direction, the puller arm assembly is operated in either direction according to well known practices.

Figure 5:
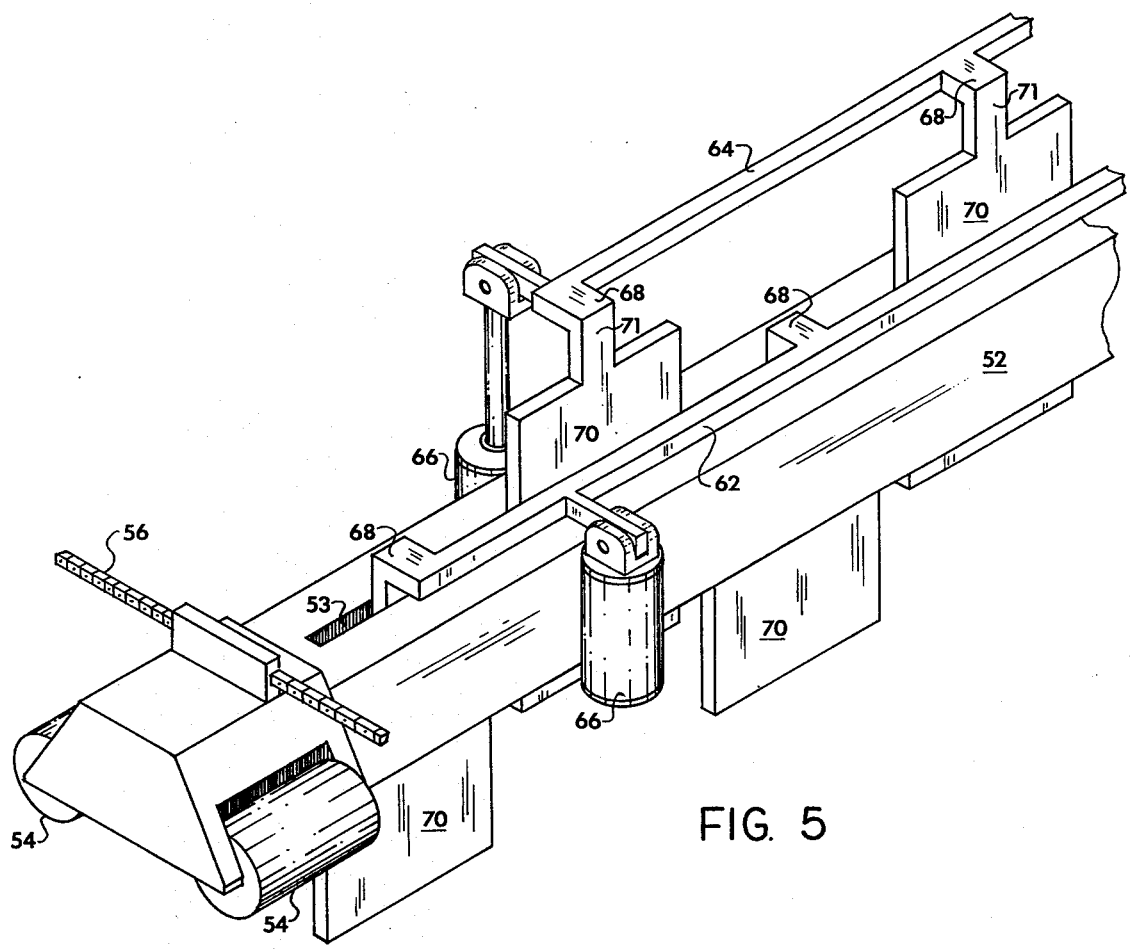
FIG. 5 is an enlarged perspective view, with parts broken away, of the snaggle-tooth puller.
Figure 8B:
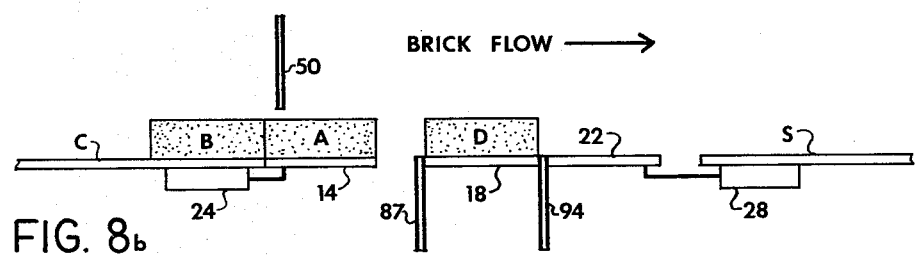
Figure 8A:
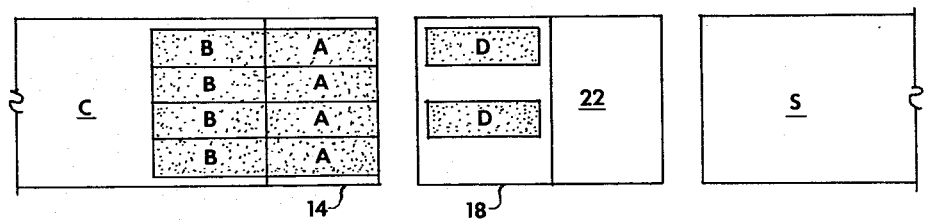
Figure 6:
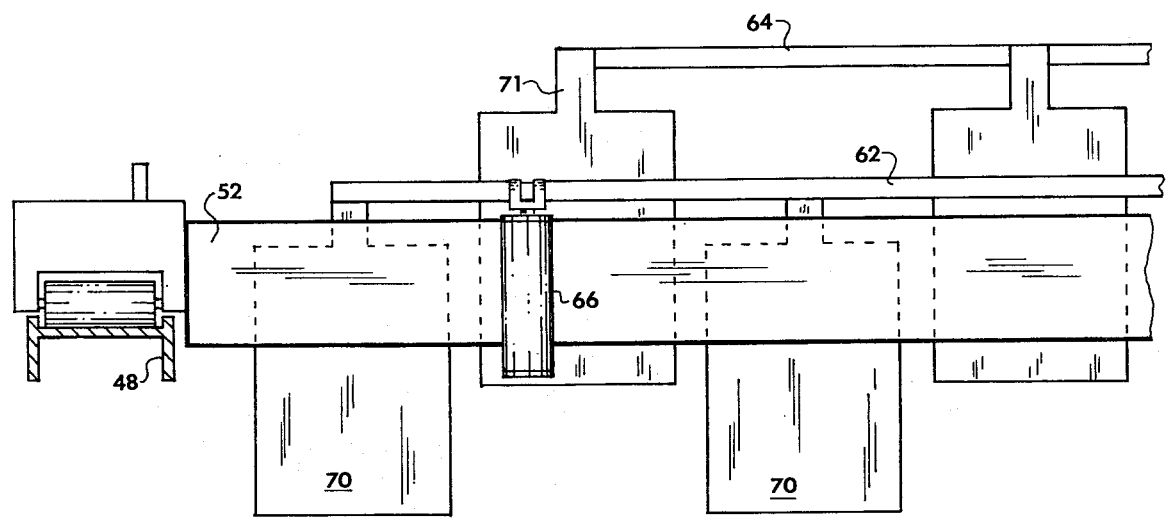
FIG. 6 is an elevation view of the snaggle-tooth puller.
Figure 7:
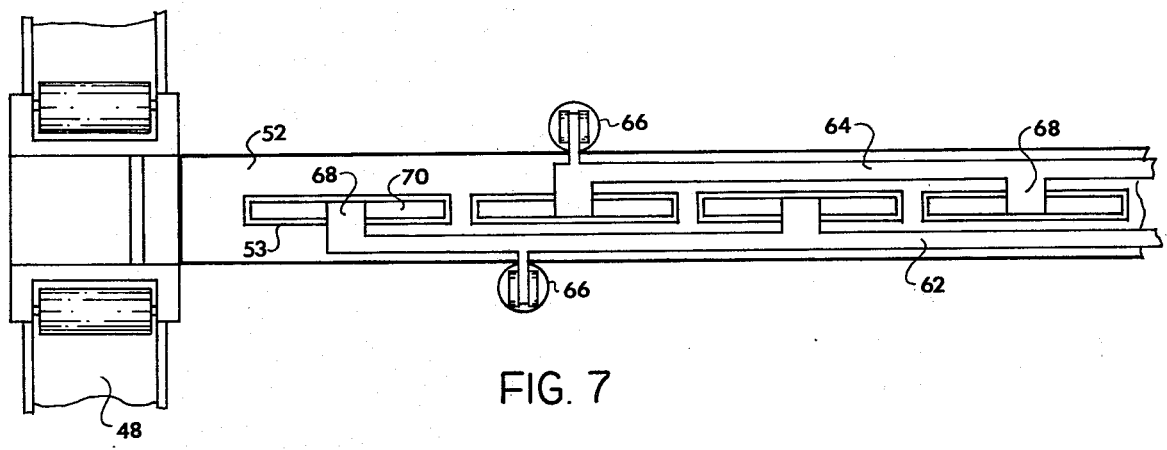
FIG. 7 is a plan view of the snaggle-tooth puller.

As best illustrated in FIGS. 5-7, housing 52 includes one or more elongated slots 53 extending downwardly therethrough along substantially the entire length of the housing. A plurality of vertically extending, and vertically reciprocating blades 70, each having a tongue 71 extends through the aforementioned slot 53, and are attached at their upper end to one of two operating rods 62,64 as illustrated in FIG. 7. Alternating ones of said blades 70 are connected to a first operating rod 62, and the other blades are connected to the second operating rod 64 by connecting links 68. Each of the connecting rods are operated by sets of pneumatic or hydraulic cylinders 66 which are operated by a suitable control circuit. Each blade 70 may be of a width corresponding to the width of one, two, or more bricks, depending on the blending pattern desired, so that alternating ones, pairs, or any desired multiples may be removed as the selected bricks. In essence, however, both operating rods may be raised or lowered simultaneously, or in alternating sequence to move a first selected number of the brick therebelow upon movement of the puller assembly 50 downstream, then move the remaining bricks upon lowering of the opposite operating bar for a successive pull. Also, if both operating bars are lowered, it is apparent that all bricks in a particular row would be moved responsive to a movement downstream of the puller bar assembly. Further, during return of the puller bar assembly, both operating rods can and should be raised, so that the blades 70 clear any bricks remaining in the path of return. It should be noted that, as an alternative, each blade or tooth 70 could be operated by individual or separate cylinders.

In the embodiment illustrated in FIGS. 1-13, a second puller bar assembly for a blended row puller mechanism 72 is provided downstream from the aforementioned snaggle-tooth puller bar assembly on the same tracks. This blended row puller bar mechanism 72 includes its own housing 74, also having one or more slots extending longitudinally thereof down through the housing. As is the case with the aforementioned puller assembly 50, pneumatic cylinders 78 move an operating rod 80 up and down according to the electrical circuit, and a plurality of links 82 activate a continuous blade 84 up and down within slot 76. This blended row puller mechanism 72 is for the purpose of moving entire blended rows of brick from the second splitter plate 22 onto the setter table S, after movement thereonto by the first puller bar assembly 50 in accordance with a sequence to be hereinafter described. The second or blended row puller mechanism 72 includes its own chain drive mechanism 86 which operates in substantially the same manner as that described hereinabove. It should be noted that the puller bar assembly 50 could be so adapted, if sequence time permits, to continue its path, with all blades down, so as to move the newly formed and blended rows onto the setter table. In such a case the second puller assembly 72 could be eliminated entirely, as well as the need for the second splitter plate 22.

Figure 2:
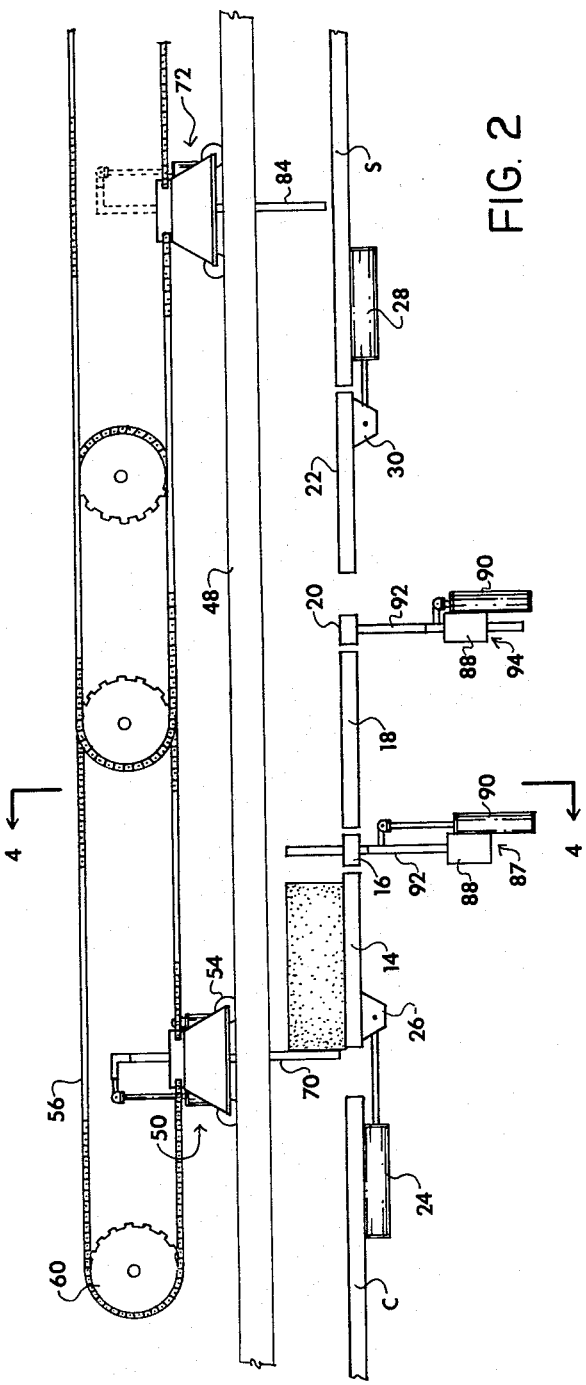
FIG. 2 is a side view of the apparatus illustrated in FIG. 1.
Figure 4:
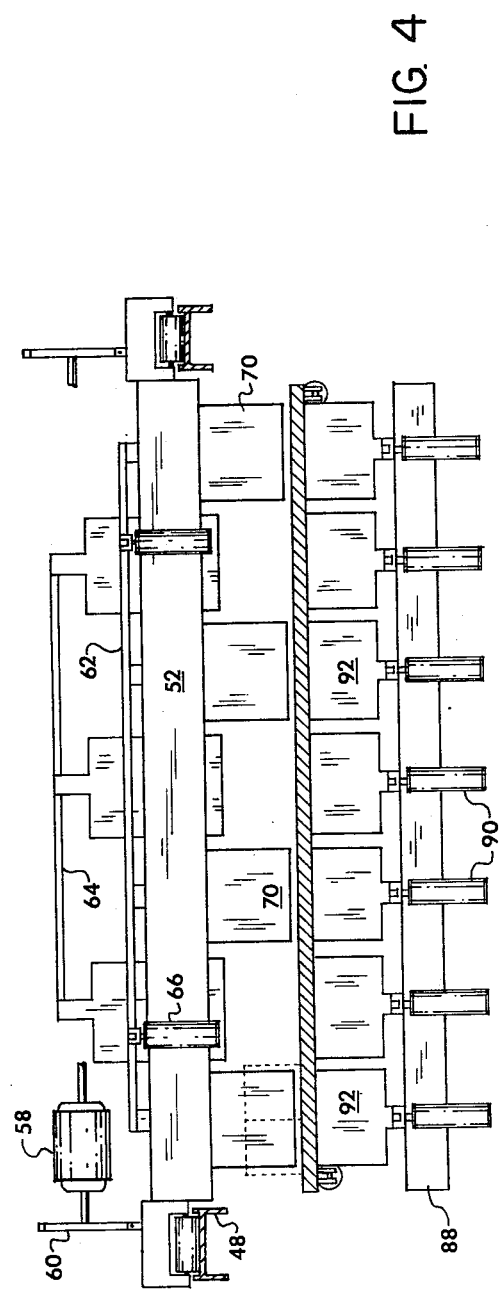
FIG. 4 is a sectional view taken substantially along lines 4—4 in FIG. 2.
Figure 3:
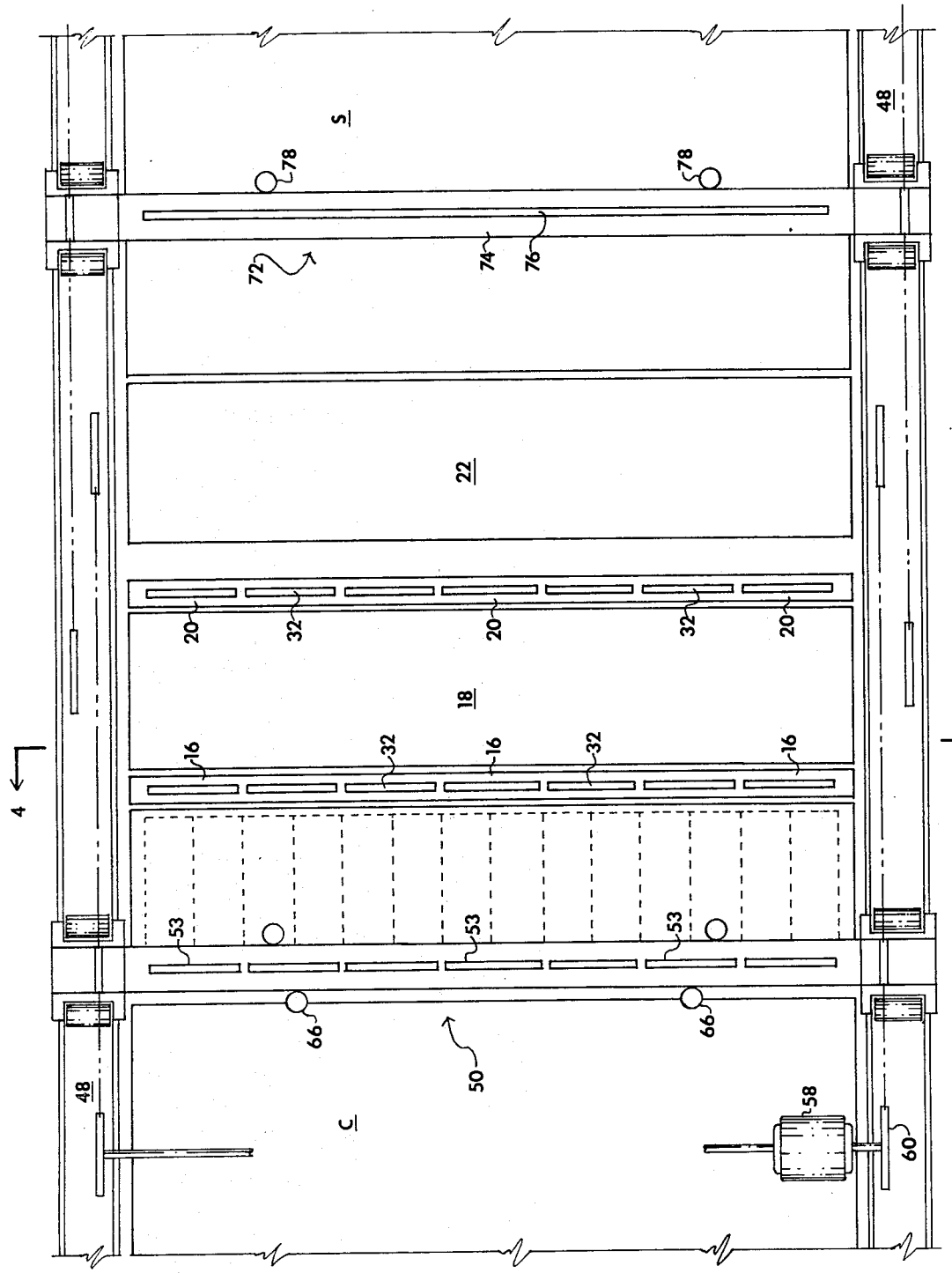
FIG. 3 is a plan view of the apparatus illustrated in FIG. 1.

Looking now at FIGS. 2 and 4, there is illustrated a first stop mechanism 87 which includes a transverse support beam 88 extending across the brick flow path and secured to the framework in any conventional manner at a point slightly below the first transition plate 16. A plurality of pneumatic cylinders 90 are mounted on the support rail across the length thereof, there are preferably being a separate pneumatic cylinder for each of the bricks in the rows being processed. Each pneumatic cylinder 90 includes a stop finger 92 attached to the free end of the operating rod thereof, and the stop fingers are adapted to be selectively moved up and down through slot or slots 32 in the transition plate 16 responsive to the activation of air or hydraulic cylinders 90. The number of cylinders 90 and width of stop fingers 92 should correspond to the width and number of blades 70 in the puller bar mechanism 50 as will become evident. So arranged, when bricks are selected to be moved from a position on the first splitter plate 14 by the blades 70 of puller bar assembly 50, correspondingly opposite stop fingers 92 will be moved upwardly through the slots 32 in transition plate 16 in the path of the unselected bricks to prevent any inadvertent movement thereof. A second stop mechanism 94, constructed in substantially the same fashion as the aforementioned stop mechanism 87 is mounted beneath in cooperating arrangement with the second transitional plate 20. These stop fingers move upwardly to provide a stop for the bricks already in the receiving row, so that as the selected bricks from the upstream row are moved into the spaces therebetween, any tendency to move the existing bricks in any manner will be thwarted.

Turning now to FIGS. 8a and 8b through FIGS. 13a and 13b, there is illustrated schematically the operational sequence involved in displacing selected brick from spaced positions in one row to another row upstream or downstream thereof. Assume that row D is illustrative of a partial, pre-loaded row placed on the blend table 18 at the outset of a continuous run; row A becomes the first row to be processed; row B becomes the second row to be processed, and so on throughout the run.

The operation begins with the preloaded row D emplaced on the blend table 18 and the stop fingers 92 retracted or in the down position. Moreover, a first row A has just been pusted through the push through cutter C, or otherwise formed in accordance with other techniques, grouped, and pushed onto the front end of splitter plate 14, which is in the receiving position. Meanwhile the blades 70 of the shaggle-tooth puller mechanism are all retracted.

Figure 9B:
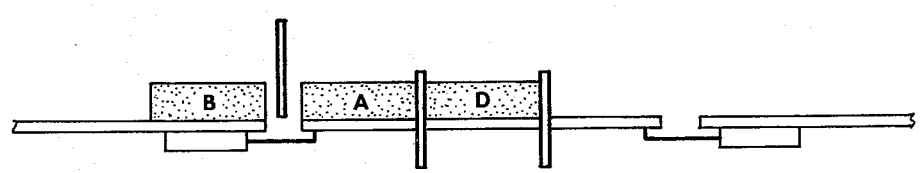
Figure 9A:
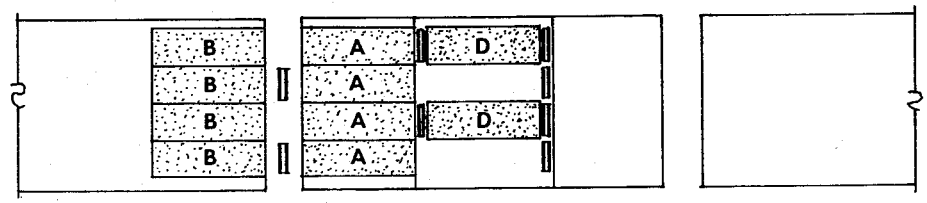

In the first step, pnaumatic or hydraulic cylinder 24 is activated to push splitter plate 14 to the unloading position shown in FIGS. 9a and 9b. Selected blades 70 of the snaggle-tooth puller are then lowered to a position adjacent the upstream header of the selected ones of the bricks (hereinafter referred to as bricks Al) to be displaced downstream. Stop fingers 92 corresponding to the unselected bricks are then raised through slots 32 in transition plate 16 to a position adjacent to and in the path of the downstream headers of the unselected bricks (bricks A2). A second set of blend or stop fingers 92 are also raised adjacent the downstream headers of the bricks D in the pre-loaded row.

Figure 10B:
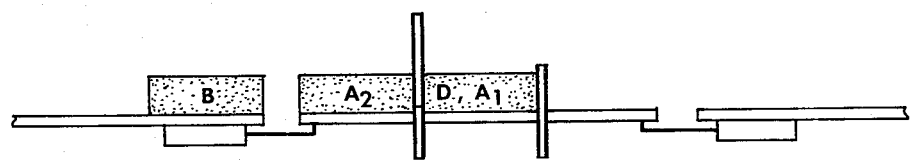
Figure 10A:
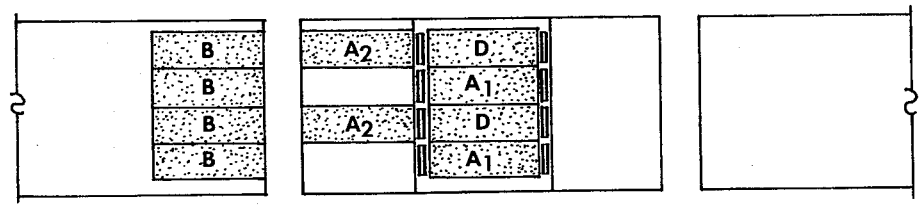
Figure 11B:
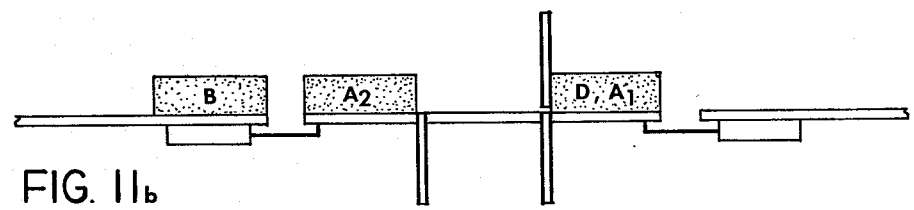
Figure 11A:
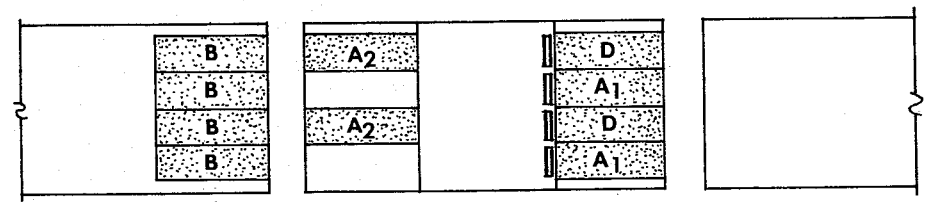
Figure 12B:
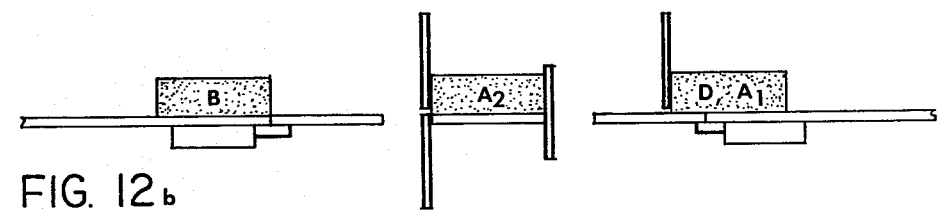
Figure 12A:
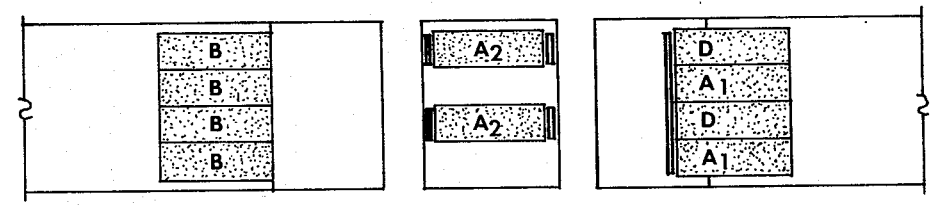

The snaggle-tooth puller bar assembly 50 is then activated to move bricks A1 from their original position in row A into a new position in the spaces in row D between the preloaded bricks on the blending plate 18 as illustrated in FIGS. 10a and 10b. In the step illustrated in FIG. 11a and 11b, a momentary pause occurs in which the blend fingers 92 retract, and in which all the blades 70 of the puller bar assembly 50 are lowered, whereupon the puller bar assembly 50 continues and pushes the newly formed row comprising original bricks D and newly inserted bricks A1 onto the second splitter plate 22.

The blades 70 of the puller bar assembly 50 are then all retracted upwardly and the puller bar assembly moves back to its initial position above the leading edge of the splitter table 14, whereupon the second group of blades 70 are activated downwardly to a position adjacent the remaining bricks A2. The corresponding stop fingers 92 from the second stop mechanism 94 are then extended upwardly to a stop position, and the puller bar assembly 50 moves the remaining bricks A2 from row A to a position on the blending table 18 which was formerly occupied by the preloaded bricks of row D, thereby forming a new row into which selected bricks B1 from row B will be received. Simultaneously with the aforementioned second pull or puller bar assembly 50, a setting table puller or blended row puller mechanism 72 pushes the previously formed row of bricks A1 and D onto the setter table S.

Figure 13B:
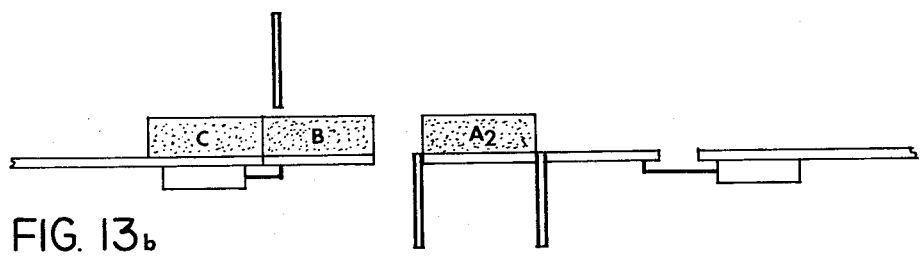
Figure 13A:
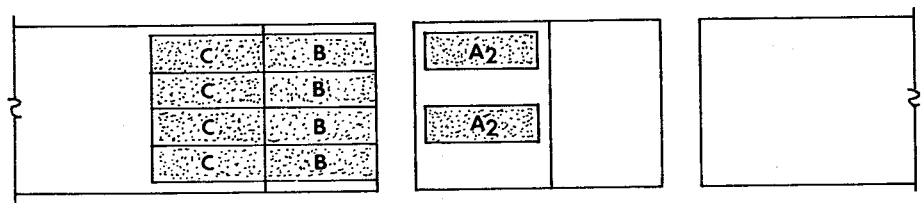

As illustrated in FIG. 13a and 13b, the puller bar assembly is returned to its original position shown in FIG. 8, whereupon the apparatus is ready for a second cycle.

Turning now to FIGS. 14–23, there is illustrated an alternate embodiment of an apparatus for effecting the basic objections of the present invention. According to FIG. 14, the main alteration appears in the blend table 112. The first splitter plate 114 portion of the plate, in reality, includes two plates 116,118. In the upper plate 116, a plurality of slots or openings 120 extend from the downstream edge of the plate 116 back toward the upstream edge, terminating at points spaced from the upstream edge. Slots 120 are of a width equalling the combined width of each brick or bricks to be removed from the initial row to form the desired blending pattern. Similarly, the shelf-like portions 122 remaining between the slots 120 equal, in width, the approximate width dimensions of the bricks not selected to be moved for the blending pattern. Thin rails or ridges 124 extend longitudinally along the edges of the plate portions 122 to prevent inadvertent dropping of the unselected bricks through the openings 120.

A second, lower plate 118 is normally disposed immediately beneath the upper plate 116, so that when a row of bricks is received from the push-through cutter C the bricks remain substantially in alignment. However, the lower plate 118 includes a hydraulically of pneumatically operated cylinder 119 which, to initiate the cycle, is lowered, thereby separating the selected brick from the unselected brick. As the lower plate 118 lowers, the brick initially positioned above the openings 120 ride downwardly to the level of a lower blending table 126, which is suspended from an upper blending plate 128 by means of support arms 130. Lower blending plate 126 remains at a constant vertical dimension from upper plate 128 and the relative dimension therebetween is unchanged during the operation. Upper plate 128 includes a plurality of slots or grooves 132 aligned with openings 120 to provide access to the snaggle-tooth puller arm assembly 50 of the first embodiment described hereinabove. Again the upper plate 128 includes rails or ridges 134 extending longitudinally along the edges to prevent inadvertent dropping of bricks passing therealong into the slots 132.

Finally, a second splitter plate 136 includes an upper plate 138 and a lower plate 140 operated by cylinder 141, and in substantially the same manner as the first splitter plate 112, with the exception that slots 12 commence at the upstream edge of the upper plate 138 and terminate at a point downstream thereof or adjacent the setter table S.

It should be noted that the splitter plate assemblies 114 and 136, are both adapted for horizontal reciprocal motion, by means of air or hydraulic assemblies 160, 170 respectively. The splitter plate assembly 114 reciprocates between the push-through cutter table C and the upstream end of the blend table 128, and the second splitter assembly 136 being reciprocal between the downstream end of the blend table 128 and the setter table S. The puller arm assembly 150 is very similar to that of the first embodiment, with the only exception that at least some of the blades are substantially longer, and adapted to extend through the slots 120 for transfer of the bricks along the lower level. Otherwise the structure of the puller arm assembly 150 is substantially the same as that illustrated and described for the first embodiment.

Figure 15:
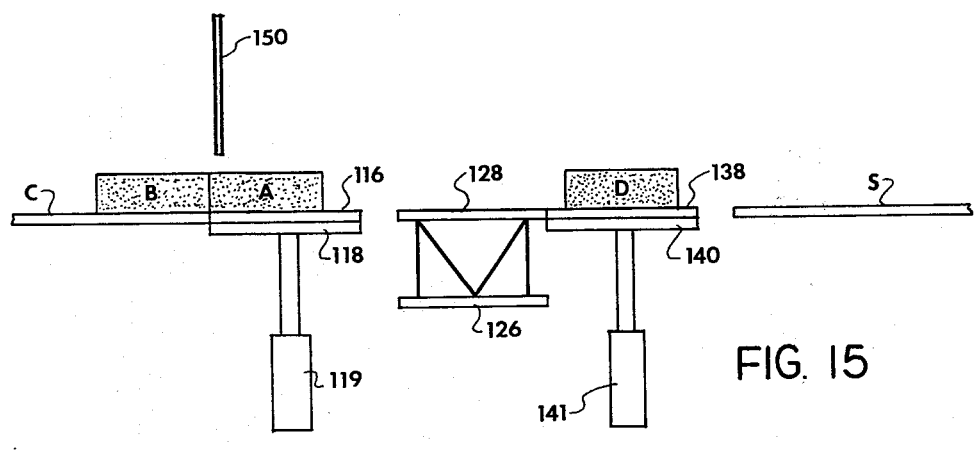
FIGS. 15–22 are schematic sequential illustrations of the steps of operation of the apparatus illustrated in FIG. 14.
Figure 16:
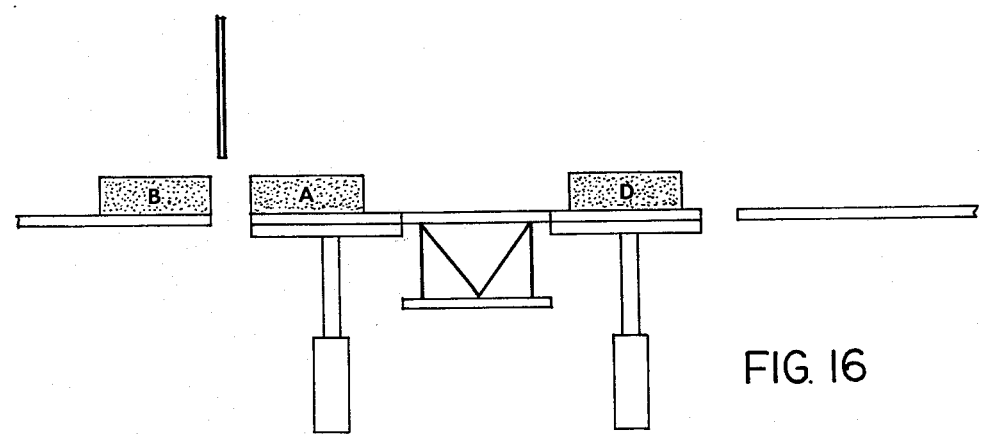
Figure 14:
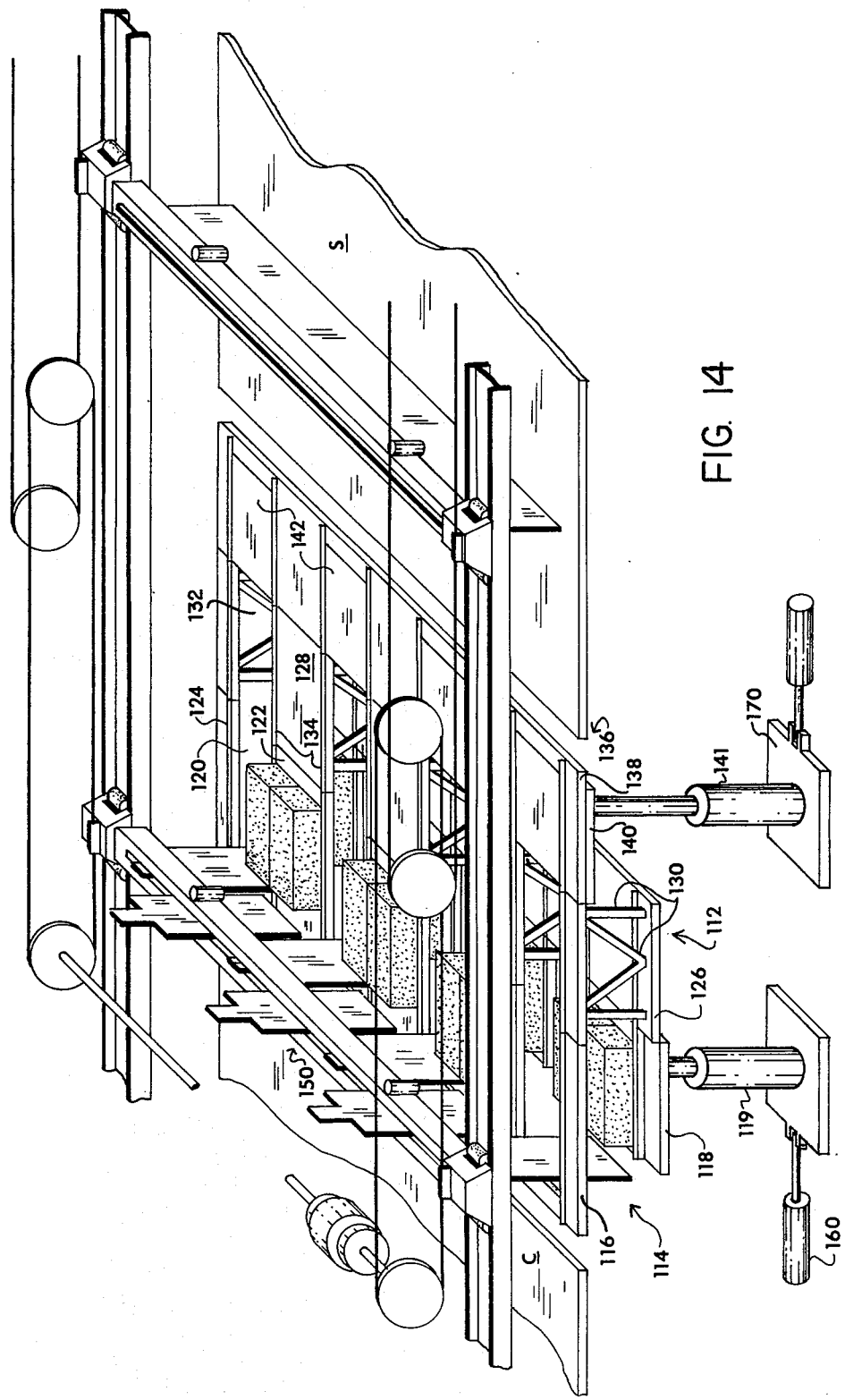
FIG. 14 is a perspective view of an apparatus according to an alternate embodiment.

In describing the operational sequence of the second embodiment, again the brick rows are numbered rows A, B, and D. At the outset as illustrated in FIG. 15, a partial row of bricks D are preloaded on the splitter plate assembly 136 with the elevator plate 140 in the raised position, while an initial full row A is pushed onto the splitter plate by the action of the bricks being pushed through the push-through cutter C. In the next FIG. 16, the splitter plate assembly 114 has been moved to the right to engage the upstream end of the blend plate 128.

Figure 17:
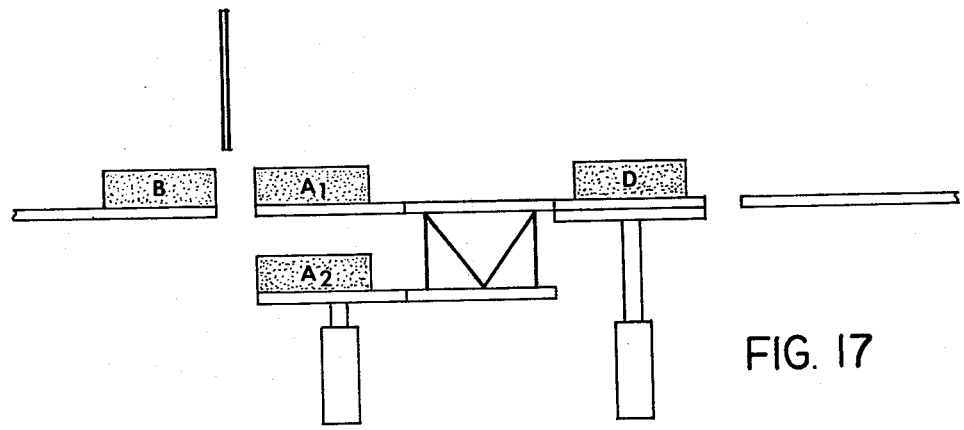
Figure 18:
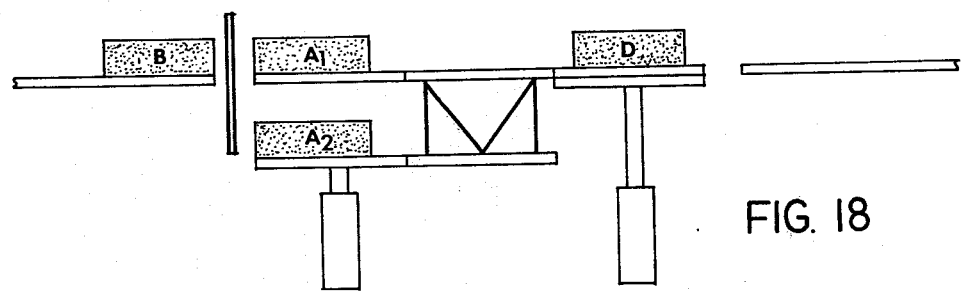
Figure 19:
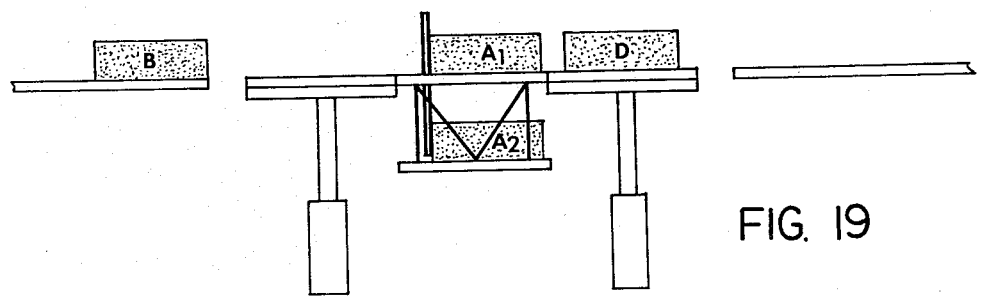

Then selected brick A2 from spaced postions in row A are lowered by the elevator plate 118 to the lower level as illustrated in FIG. 17. The blades 170 of the snaggle-tooth puller assembly 150 are lowered so that some of the blades engage the upstream headers of row of bricks in row A1 while the longer blades engage the upstream headers of the bricks in row A2 (FIG. 18). It is apparent that the blades 170 of the snaggle-tooth puller bar assembly 150 have extended through the slots 120 in the upper splitter plate 116. The puller bar assembly 150 advances to move the bricks A1 onto the upper blend plate 128 ( FIG. 19), while the bricks A2 on the lower elevator plate 118 are moved downstream to the lower blend plate 126.

Figure 20:
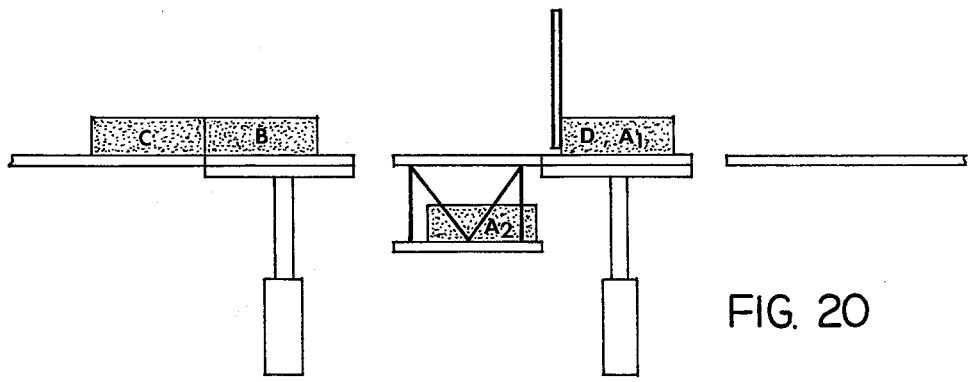
Figure 21:
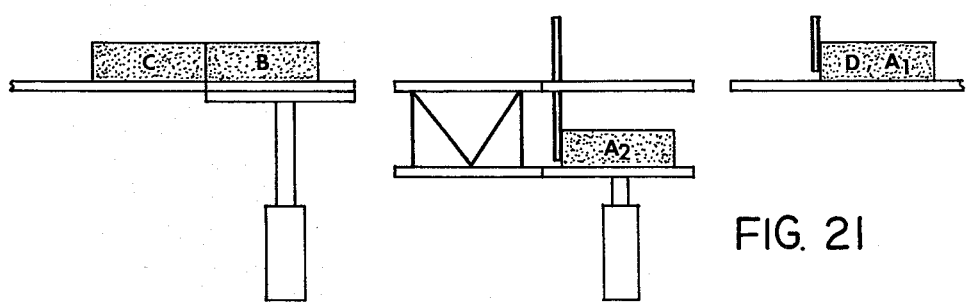

As illustrated in FIG. 20, the longer blades 170 of the snaggle-tooth puller bar assembly 150 retract, as the puller bar assembly moves forward to move the bricks A1 on the upper plate 128 into the spaces originally left in row D. It should be recognized that in row D, the preloaded bricks are placed on the lower plate 140 at such positions as to align with slots 142, while the bricks entering from row A slide along the upper plate 138. Simultaneously, a new row of brick B has been urged onto the first splitter plate assembly 114, which has had the elevator plate 118 returned to its uppermost position. The puller bar assembly 150 then returns and the longer blades 70 are extended once again into engagement with the headers of the bricks A2 on the lower level 126 of the blend table, and the lower plate 140 of the second splitter plate assembly 136 is returned to its lowermost position. The puller bar assembly then is moved again downstream to move the remaining bricks A2 onto the lower plate 140 (FIG. 21).

Figure 22:
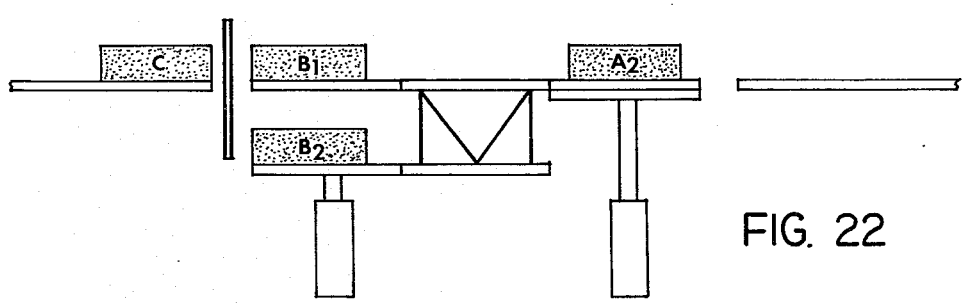

The puller bar assembly 150 then returns to its original position with the blades 170 raised to clear the bricks B already therepositioned, and the cycle is ready to repeat (FIG. 22).

There is thus provided a method and apparatus for effecting the intra-row blending of bricks by mechanical displacement of selected bricks within each row from spaced positions therein and transfer of such selected bricks into corresponding positions in other rows either downstream or upstream. The operation is carried out with a minimum of steps and brick movement with the result that brick damage, break downs, loss of time and the like is prevented to a large extent.

One possible alternative, which is not illustrated, but which is considered within the inventive concept is a blending apparatus incorporated into the dehacking side of the process. The apparatus, using concepts set forth above, is installed between the dehacker and stacking mechanism. In such embodiment the bricks are arranged with their rows extending along the brick flow path, rather than across as illustrated and discussed hereinabove. As the bricks are marshalled (moved and stopped intermittently) each course passes an area having either a snaggle-tooth pusher arranged to move across the brick flow path or side plates with spaced openings therein. Selected bricks from spaced positions in the rows (which extend along the brick flow path) are moved lateral to another row. The bricks moved out of the path on one side are then pushed back in the opposite direction during the next cycle.

It should be recognized that although the embodiments described hereinabove generally refer to the displacement of bricks by one row, the displacement could just as easily occur throughout two, three, or even more rows, depending on the ultimate pattern to be achieved. Also, minor changes could be made to the apparatus or sequencing of the steps of the operation, while still operating within the scope of the invention, which is to be determined by the following set of claims.

What is claimed is:

1. Method of effecting intra-row blending of bricks comprising the steps of:
    (a) at a blending station mechanically collecting and grouping bricks delivered in a plurality of parallel rows, each initially containing the same number of bricks;
    (b) transferring selected bricks from a plurality of spaced positions in one row to a corresponding plurality of positions in a second row to form a new intra-blended row; and
    (c) transferring selected bricks from a plurality of spaced positions corresponding to the spaced positions of step (b) in a third row into the openings formed in said first row during step (b).

2. Apparatus for effecting intra-row blending of bricks by inter-row displacement of selected bricks from selected spaced positions in each row to corresponding spaced positions comprising:
    (a) a blending station having a table means and a feeding means for depositing a plurality of parallel, substantially aligned, rows of unblended bricks thereon, each of said rows formed by an equal number of bricks therein arranged in side-by-side relation;
    (b) said table means includes a first splitter plate for initially receiving said rows of unblended bricks, said splitter plate having horizontal shift means connected thereto for shifting said splitter plate between an initial receiving position and a second unloading position; a second stationary blending plate positioned adjacent the downstream edge of said splitter plate when in said second position; and a second splitter plate having horizontal shift means connected thereto for shifting said splitter plate between a first position adjacent the downstream edge of said blend plate and a second position spaced horizontally therefrom; and
    (c) a transfer means for separating and moving selected bricks at said blending station from a first plurality of spaced positions, but not from all positions, in one of said rows to a plurality of corresponding spaced position in a second of said rows.

3. The apparatus according to claim 2 wherein said first splitter plate includes an upper and lower deck, said upper deck having a plurality of spaced slots therein commencing at the downstream edge thereof and extending in an upstream direction a distance at least equal to the length of a brick, the width of each of said slots being at least as wide as the width of one brick, said lower deck comprising a solid plate vertically reciprocal between an uppermost position substantially adjacent the undersurface of said upper deck and a lower position spaced therefrom; said blending plate comprising an upper slotted deck, the slots in said upper deck aligning with said aforementioned slots in said upper deck on said first splitter plate and a lower stationary deck horizontally aligned with the lowermost position of said lower deck of said first splitter plate; and said second splitter plate comprising an upper and lower deck, said upper deck including a plurality of slots aligned with said aforementioned slots and commencing at the upstream edge of said upper deck and continuing downstream a distance at least equal to the length of the brick, said lower deck being a solid plate member vertically reciprocable between an uppermost position substantially adjacent the undersurface of said upper deck and a lowermost position horizontally aligned with the lower deck of said blending portion; and wherein said separating means further includes a puller bar mechanism having a plurality of vertically extendable and reciprocable blades extending downwardly therefrom, said puller bar including a drive mechanism for movement longitudinally of said blending table means.

4. The apparatus according to claim 3 wherein said puller bar assembly includes a pair of rails mounted to extend longitudinally along and on either side of the area above said blending table means, a housing extending between said rails and movably connected thereto, a drive mechanism connected to said housing for selected movement of said housing back and forth along said rails, said housing including at least one slot extending the length thereof and downwardly therethrough, through which said blades extend.

5. The apparatus according to claim 4 wherein at least some of said blades extend downwardly a distance sufficiently to extend through the slots in said upper deck into engagement with bricks deposited on said lower deck, yet retract sufficiently to clear all bricks on both the upper and lower decks.

6. Apparatus for effecting intra-row blending of bricks by inter-row displacement of selected bricks from selected spaced positions in each row to corresponding spaced positions in another row comprising:
    (a) a blending station having a table means and a feeding means for depositing a plurality of parallel, substantially aligned, rows of unblended bricks thereon, each of said rows formed by an equal number of bricks therein arranged in side-by-side relation;
    (b) a transfer means for separating and moving selected bricks from a first plurality of spaced positions, but not from all positions, in one of said rows to a plurality of corresponding spaced positions in a second of said rows; and (c) said transfer means comprising:
 (i) a first set or plurality of stop means selectively movable from a retracted position to a stopping position upstanding from the surface of said blending table means between said receiving position and said blending position;
 (ii) a second set or plurality of stop means selectively movable from a retracted position to an upstanding position extending upwardly from the surface of said blending table means at a position downstream from said blending position, each of said stop means being of such a width as to block movement of at least one of said bricks being processed; and
 (iii) a puller bar means mounted for reciprocal movement above said blending table means, said puller bar assembly including a plurality of depending blades, selectively movable according to a prescribed pattern between an operative lowered position adjacent the headers of selected one of said bricks and an inoperative raised position above the upper surface of said brick, whereby when said blades are activated and said puller bar assembly is moved, said blades will engage the headers of selected bricks and move them along said blending table means.

7. The apparatus according to claim 6 wherein said puller bar mechanism includes a pair of rails mounted to extend longitudinally along and on either side of the area above said blending table means, a housing extending between said rails and movably connected thereto, a drive mechanism connected to said housing for selected movement of said housing back and forth along said rails, said housing including at least one slot extending the length thereof and downwardly therethrough, through which said blades extend.

8. The apparatus according to claim 7 wherein a pair of spaced operating rods are each connected to reciprocal activating means, alternating ones of said blades forming a set which is connected to one of said operating rods in such a manner that they extend through the slot in said housing, other ones of said blades forming a second set which is connected to the other of said operating rods in such manner as to extend through said slot in the housing, whereby upon activation of one of said operating rods, one of said sets of blades is lowered, while upon activation of the other operating rod, the other set of blades is lowered.

9. The apparatus according to claim 6 wherein said stop means includes a plurality of fingers extending through said blending table means, each of said fingers being connected to a vertically reciprocal activating mechanisms for selectively and individually moving said fingers between said upstanding position and said retracted position.

10. Method of effecting intra-row blending of bricks by inter-row displacement of seleced bricks from spaced positions in the rows comprising the steps of:
 (a) receiving rows of bricks having an equal prescribed number therein and being arranged with the longitudinal dimension of said rows parallel to each other;
 (b) transferring selected bricks from a plurality of spaced positions in one row located in a first position to corresponding positions in another row located in a second position removed from said one row and having corresponding openings therein, while leaving undisturbed the relative positions of the other non-selected bricks in said one row, to form a new, intra-blended row, wherein said separating and moving includes the engagement and pushing against the upstream headers of selected, spaced bricks in said one row and pushing said selected bricks downstream to a preceding row in which corresponding openings having previously been formed;
 (c) moving said newly formed row out of said second position;
 (d) subsequently moving the non-selected bricks from said original row to said second position; and
 (e) repeating steps (a) through (d) to form new blended rows.

11. Method of effecting intra-row blending of bricks by inter-row displacement of selected bricks from spaced positions in the rows comprising the steps of:
 (a) receiving rows of bricks having an equal prescribed number therein and being arranged with the longitudinal dimension of said rows parallel to each other;
 (b) transferring selected bricks from a plurality of spaced positions in one row located in a first position to corresponding positions in another row located in a second position removed from said one row and having corresponding openings therein, while leaving undisturbed the relative positions of the other non-selected bricks in said one row, to form a new, intra-blended row, wherein said transferring comprises the lowering of selected, spaced bricks from said one row to a lower level, the horizontal movement of the bricks in said separated rows along the upper and lower level, and the elevation of said selected bricks on the lower level and to corresponding openings in a subsequent row on the upper level.

12. Apparatus for effecting intra-row blending of bricks by inter-row displacement of selected bricks from selected spaced positions in each row to corresponding spaced positions in another row comprising:
 (a) a blending table means and a feeding means for initially depositing each of a plurality of successive, parallel rows of unblended brick at a first area on said blending table means in spaced relation to all successive rows therebehind;
 (b) transfer means for separating and moving selected bricks from a first plurality of spaced positions in each row, but not from all positions in each row, to a plurality of corresponding positions in a similar preceding row positioned at a second area on said blending table means to form a blended row;
 (c) said transfer means being further operable to move said blended row out of said second area and to move the unselected bricks from said first area to corresponding positions in said second area of said blending table means in preparation for receiving a new row of unblended bricks at said first area.

* * * * *